United States Patent
Fang et al.

(10) Patent No.: US 9,473,765 B2
(45) Date of Patent: Oct. 18, 2016

(54) THREE-DIMENSIONAL SHUTTER GLASSES AND GRAYSCALE DRIVING METHOD THEREOF

(71) Applicant: SHENZHEN CHINA STAR OPTOELECTRONICS TECHNOLOGY CO., LTD., Shenzhen (CN)

(72) Inventors: Bin Fang, Shenzhen (CN); Chihming Yang, Shenzhen (CN)

(73) Assignee: SHENZHEN CHINA STAR OPTOELECTRONICS TECHNOLOGY CO., LTD, Shenzhen (CN)

( * ) Notice: Subject to any disclaimer, the term of this patent is extended or adjusted under 35 U.S.C. 154(b) by 372 days.

(21) Appl. No.: 14/235,807

(22) PCT Filed: Jan. 6, 2014

(86) PCT No.: PCT/CN2014/070147
§ 371 (c)(1),
(2) Date: Jan. 29, 2014

(87) PCT Pub. No.: WO2015/100741
PCT Pub. Date: Jul. 9, 2015

(65) Prior Publication Data
US 2015/0189263 A1    Jul. 2, 2015

(30) Foreign Application Priority Data

Dec. 30, 2013  (CN) .......................... 2013 1 0745343

(51) Int. Cl.
*H04N 13/04* (2006.01)
(52) U.S. Cl.
CPC ...... *H04N 13/0438* (2013.01); *H04N 13/0497* (2013.01); *H04N 2213/008* (2013.01)
(58) Field of Classification Search
CPC ..................... H04N 13/0429; H04N 13/0438
See application file for complete search history.

(56) References Cited

U.S. PATENT DOCUMENTS

| 2012/0098830 | A1* | 4/2012 | Kim ................... G02B 27/2264 345/419 |
| 2013/0050300 | A1* | 2/2013 | Ito ........................ G09G 3/3614 345/691 |
| 2013/0076864 | A1* | 3/2013 | Takahashi .............. G09G 3/003 348/46 |

* cited by examiner

*Primary Examiner* — Christopher Findley
(74) *Attorney, Agent, or Firm* — Mark M. Friedman

(57) ABSTRACT

A grayscale driving method for three-dimensional (3D) shutter glasses is provided herein and comprises steps of: for every two frames as a cycle, sequentially inputting a first signal and a second signal into a first glass and a second glass, and the polarities of the first signal and the second signal in the cycle are the same; changing the polarities of the first signal and the second signal when the cycle transits into a next cycle; and respectively inputting a third signal and a fourth signal into the first glass and the second glass during the cycle to adjust the gamma voltages of the first signal and the second signal in the first glass and the second glass.

6 Claims, 8 Drawing Sheets

| Time | 1st frame | 2nd frame | 3rd frame | 4th frame | 5th frame | 6th frame | 7th frame | 8th frame | 9th frame | ... →Time |
|---|---|---|---|---|---|---|---|---|---|---|
| Input signal | L255 | L0 | L255 | L0 | L255 | L0 | L255 | L0 | L255 | ... |
| L/R | L | R | L | R | L | R | L | R | L | ... |
| Polarity | + | + | - | - | + | + | - | - | + | ... |
| Luminance | bright | dark | bright | dark | bright | dark | bright | dark | bright | ... |
| P-gamma | P-gamma (1) | P-gamma (2) | P-gamma (1) | P-gamma (2) | P-gamma (1) | P-gamma (2) | P-gamma (1) | P-gamma (2) | P-gamma (1) | ... |

| Time | 1st frame | 2nd frame | 3rd frame | 4th frame | 5th frame | 6th frame | 7th frame | 8th frame | 9th frame | → Time |
|---|---|---|---|---|---|---|---|---|---|---|
| Input signal | ☐ | ■ | ☐ | ■ | ☐ | ■ | ☐ | ■ | ☐ | ... |
| | L255 | L0 | L255 | L0 | L255 | L0 | L255 | L0 | L255 | ... |
| L/R | L | R | L | R | L | R | L | R | L | ... |
| Polarity | + | − | + | − | + | − | + | − | + | ... |

L0 voltage : High(+) ‾‾‾‾‾  V-com ‾·‾·‾  Low(−) ‾‾‾‾ small voltage difference

L255 voltage : High(+) ‾‾‾‾‾  V-com ‾·‾·‾  Low(−) ‾‾‾‾ large voltage difference

FIG. 1A
Prior art

| Time | 1st frame | 2nd frame | 3rd frame | 4th frame | 5th frame | 6th frame | 7th frame | 8th frame | 9th frame | Time → |
|---|---|---|---|---|---|---|---|---|---|---|
| Input signal | ☐ | ■ | ☐ | ■ | ☐ | ■ | ☐ | ■ | ☐ | ⋯ |
|  | L255 | L0 | L255 | L0 | L255 | L0 | L255 | L0 | L255 | ⋯ |
| L/R | L | R | L | R | L | R | L | R | L | ⋯ |
| Polarity | + | + | − | − | + | + | − | − | + | ⋯ |

FIG. 1B
Prior art

| Time | 1st frame | 2nd frame | 3rd frame | 4th frame | 5th frame | 6th frame | 7th frame | 8th frame | 9th frame | → Time |
|---|---|---|---|---|---|---|---|---|---|---|
| Input signal | L255 | L0 | L255 | L0 | L255 | L0 | L255 | L0 | L255 | ... |
| L/R | L | R | L | R | L | R | L | R | L | ... |
| Polarity | + | + | − | − | + | + | − | − | + | ... |
| Luminance | bright | dark | bright | dark | bright | dark | bright | dark | bright | ... |

FIG. 1C
Prior art

| Time | 1st frame | 2nd frame | 3rd frame | 4th frame | 5th frame | 6th frame | 7th frame | 8th frame | 9th frame | →Time |
|---|---|---|---|---|---|---|---|---|---|---|
| Input signal | L255 | L0 | L255 | L0 | L255 | L0 | L255 | L0 | L255 | ... |
| L/R | L | R | L | R | L | R | L | R | L | ... |
| Polarity | + | + | - | - | + | + | - | - | + | ... |
| Luminance | bright | dark | bright | dark | bright | dark | bright | dark | bright | ... |
| P-gamma | P-gamma (1) | P-gamma (2) | P-gamma (1) | P-gamma (2) | P-gamma (1) | P-gamma (2) | P-gamma (1) | P-gamma (2) | P-gamma (1) | ... |

FIG. 2

THREE-DIMENSIONAL SHUTTER GLASSES AND GRAYSCALE DRIVING METHOD THEREOF

FIELD OF THE DISCLOSURE

The present invention relates to the field of a gray scale driving method for three-dimensional shutter glasses (3D SG), and more particularly relates to a grayscale driving method for 3D SG for adjusting luminance in the left and right eye.

BACKGROUND OF THE DISCLOSURE

Generally, the display devices for three-dimensional shutter glasses (3D SG) are required to include a higher screen refresh rate (generally required to be 120 Hz or 240 Hz) and the frequency of the 3D SG is 60 Hz to perform 3D effect. When a 3D signal is transmitted to the display device (such as a monitor, a projector and so on), images are alternately generated in the right or left eye in accordance with a frame sequence and transmitted wirelessly. The 3D SG receives the 3D signal and refreshes synchronously, and the corresponding images can be watched by the left and right eye and the amount of frames is kept to be the same when watching 2D images. Therefore, the different images with fast switching are watched by both eyes, and the illusion, which is an effect cannot be shot by a camcorder, is generated in the human brain and the 3D images can be seen.

FIG. 1A is an input signal polarity switching table for a pixel position in the left eye glass or the right eye glass of the 3D SG when the input signals are black and white image for the left and right. As shown in FIG. 1A, L0 and L255 respectively represent the grayscale signals for black and white images. If the L0 signal is positive polarity, the L255 signal is negative polarity and vice versa. In addition, since the voltage difference in the L0 signal is smaller, the positive and the negative voltages are close to the common voltage (V-com). Since the voltage difference in L255 signal is larger, the positive and the negative voltages are very different from the common voltage (V-com). Therefore, if the image displayed in one position of the 3D SG is always in the same polarity for a long time, as the table shown in FIG. 1A, the L255 signal keeps being positive polarity and the L0 signal keeps being negative polarity for a long period of time, charge residue similar to a direct current (DC) operation occurs in that position. It is called a 3D image sticking problem.

FIG. 1B is an input signal polarity switching table for a pixel position in the left eye glass or the right eye glass of the 3D SG for improving 3D image sticking problem. As shown in FIG. 1B, if the polarity of the image data signal is changed once every two frames, the L255 or L0 signal has both the positive and negative polarities, and the 3D image sticking problem is solved. However, when the polarity is changed once every two frames, the 3D image sticking problem is solved but another 3D images overlapping problem arises since the luminance difference sensed by the left and right eye becomes larger. As shown in FIG. 1C, since the luminance difference sensed by the left and right eye has become larger, the 3D images overlapping problem has been generated to affect the 3D display result. The luminance difference between the left and right eyes in 3D display is generated because all of the pixel charges rearranged by the share capacitance are different between odd frames and even frames in a color washout design.

Accordingly, a need has arisen to design a grayscale signal driving method to solve the 3D image sticking problem in 3D mode and the 3D image overlapping problem, which is generated when the luminance difference between the left and right eye is large.

SUMMARY OF THE DISCLOSURE

One objective of the present invention is to provide a grayscale driving method to solve the 3D image sticking problem in 3D SG and the 3D image overlapping problem at the same time.

In order to solve the technical problem described above, a grayscale driving method for three-dimensional (3D) shutter glasses is provided herein and comprises steps of: for every two frames as a cycle, sequentially inputting a first signal and a second signal into a first glass and a second glass and the polarities of the first signal and the second signal in the cycle are the same; changing the polarities of the first signal and the second signal when the cycle transits into the next cycle; and respectively inputting a third signal and a fourth signal into the first glass and the second glass during the cycle to respectively adjust gamma voltages of the first signal and the second signal in the first glass and the second glass.

In one embodiment of the present invention, the first signal and the second signal are image grayscale signals for providing images in the first glass and the second glass, and the third signal and the fourth signal are programmable-gamma (P-gamma) signals for dynamically adjusting the gamma voltages of the first signal and the second signal.

In one embodiment of the present invention, the third signal and the fourth signal adjust the gamma voltage of the first signal and the second signal in accordance with a gamma curve.

Another objective of the present invention is to provide 3D shutter glasses, and the 3D image sticking problem and the 3D image overlapping problem can be solved by the 3D SG.

In order to solve the technical problem described above, a 3D shutter glasses is provided herein and comprises a first glass, a second glass, a liquid crystal layer, and a controlling module. The first glass is for receiving the left eye images. The second glass is for receiving the right eye images. The liquid crystal (LC) layer installs in the first glass and the second glass respectively. The controlling module is electrically connected with the first glass and the second glass respectively, and the controlling module comprises a source driving integrated circuit (IC) and a programmable-gamma IC. The source driving IC is for outputting a first signal and a second signal respectively for controlling image grayscale of the LC layers in the first glass and the second glass and the P-gamma IC is for outputting a third signal and a fourth signal for respectively adjusting gamma voltages of the first signal and the second signal in the first glass and the second glass.

In one embodiment of the present invention, the first signal and the second signal are image grayscale signals, and the third signal and the fourth signal are programmable gamma (P-gamma) signals.

In one embodiment of the present invention, the third signal and the fourth signal dynamically adjust the gamma voltages of the first signal and the second signal in accordance with a gamma curve to make the luminance sensed by the left and right eye the same.

One another objective of the present invention is to provide a grayscale driving method to dynamically adjusting the luminance sensed by the left and right eye in 3D display mode. In order to solve the technical problem described above, a grayscale driving method for three-dimensional (3D) shutter glasses is provided herein and comprises steps of: for every two frames as a cycle, sequentially inputting a first signal and a second signal into a first glass and a second glass from a source driving IC in one cycle and polarities of the first signal and the second signal in the cycle are the same; changing the polarities of the first signal and the second signal when the cycle transits into the next cycle; and respectively inputting a third signal and a fourth signal into the first glass and the second glass from a P-gamma IC during the cycle to respectively adjust the gamma voltages of the first signal and the second signal in the first glass and the second glass.

In one embodiment of the present invention, the first signal and the second signal are image grayscale signals for providing images in the first glass and the second glass, and the third signal and the fourth signal are programmable-gamma (P-gamma) signals for dynamically adjusting the gamma voltages of the first signal and the second signal.

In one embodiment of the present invention, the third signal and the fourth signal adjust the gamma voltages of the first signal and the second signal in accordance with a gamma curve.

The advantage of the present invention is that two P-gamma signals are implemented to solve the 3D image sticking problem and the luminance difference problem seen by the left and right eye in 3D display mode at the same time.

DESCRIPTION OF THE DRAWINGS

FIG. 1A is an input signal polarity switching table for a pixel position in the left eye glass or the right eye glass of the 3D SG when the input signals are black and white images for the left and right;

FIG. 1B is an input signal polarity switching table for a pixel position in the left eye glass or the right eye glass of the 3D SG for improving the 3D image sticking problem;

FIG. 1C is an input signal polarity switching table for a pixel position in the left eye glass or the right eye glass of the 3D SG in prior art;

FIG. 2 is an input signal polarity switching table for a pixel position in a first glass or a second glass of three-dimensional (3D) shutter glasses (SG) in one embodiment of the present invention;

DETAILED DESCRIPTION OF THE PREFERRED EMBODIMENTS

The above-mentioned description of the present invention can be best understood by referring to the following detailed description of the preferred embodiments and the accompanying drawings.

FIG. 2 is an input signal polarity switching table for a pixel position in a first glass or a second glass of three-dimensional (3D) shutter glasses (SG) in one embodiment of the present invention. The first glass is for receiving left eye images and the second glass is for receiving right eye images. Alternatively, in a different embodiment, the first glass is for receiving right eye images and the second glass is for receiving left eye images, and it is not limited herein. A shown in FIG. 2, in order to overcome the 3D image overlapping problem due to the luminance differences sensed by the left and right eye being too large, in the present invention, not only the grayscale signal but gamma signals are also respectively added into the input signals for the first glass and the second glass to adjust the luminance sensed by the left and right eye, and the luminance sensed by the left and right eye is the same. The adjustment of the gamma signal is based on the gamma curve. In the display device, there is a non-linear relationship between the luminance of the pixel and the voltage added in the pixel, and the curve to perform the non-linear relationship is called the gamma curve. Since the general pixel signal is the data signal and there is a non-linear relationship between the luminance of the pixel and the voltage applied to the pixel, the voltage of the data signal can be adjusted in accordance with the gamma curve so as to adjust the luminance sensed by the left and right eye to be the same. In addition, the gamma signal in the embodiment of the present invention is preferred to be a programmable gamma (P-gamma) signal, and the P-gamma signal can be generated by adding a programmable gamma integrated circuit (IC) in the source driving IC. The P-gamma IC can transmit the P-gamma signal to the pixels through the source driving IC to adjust the voltage of the pixel grayscale.

Figure 3:
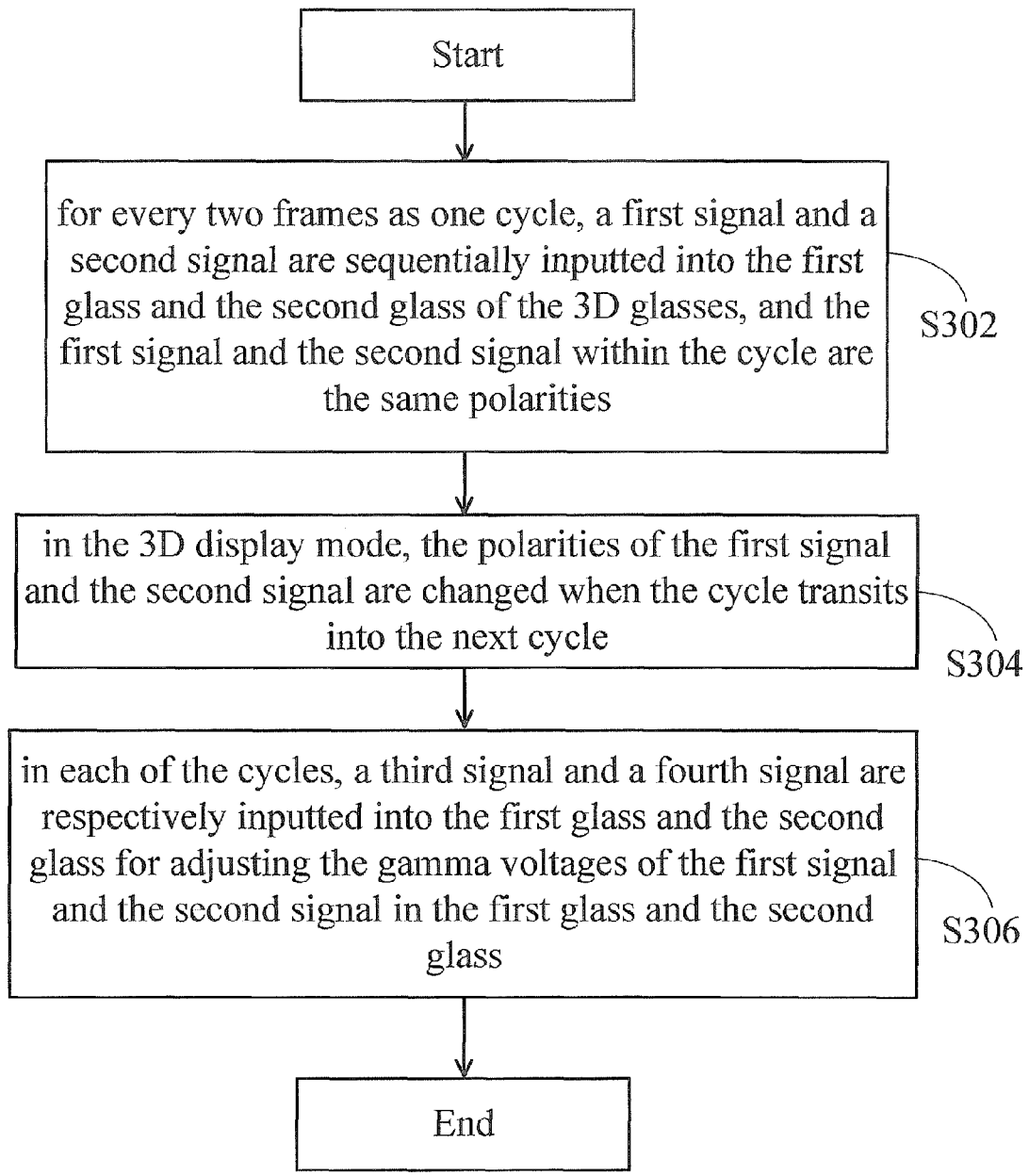
FIG. 3 is a flowchart of a driving method of the first glass and the second glass of the 3D SG in the embodiment of the present invention.

FIG. 3 is a flowchart of a driving method of the first glass and the second glass of the 3D SG in the embodiment of the present invention. As shown in FIG. 3, in step S302, for every two frames as one cycle, a first signal and a second signal are sequentially inputted into the first glass and the second glass of the 3D glasses, and the first signal and the second signal within the cycle are the same polarities. For example, a first frame and a second frame are included in one cycle, and the first signal is inputted into the first glass in the first frame and the second signal is inputted into the second glass in the second frame. The first signal and the second signal respectively inputted in the first frame and the second frame are the same polarities. The first glass is for receiving the left eye image and the second glass is for receiving the right eye image. Alternatively, in a different embodiment, the first glass is for receiving the right eye image and the second glass is for receiving the left eye image, and it is not limited herein. In addition, in the embodiment of the present invention, the polarities of the first signal and the second signal respectively inputted in the sequence with the first frame and the second frame are positive. However, in a different embodiment, the polarities of the first signal and the second signal in the first frame and the second frame can be negative, and it is not limited herein.

In step S304, in the 3D display mode, the polarities of the first signal and the second signal are changed when the cycle transits into the next cycle. For example, in the embodiment of the present invention, the polarities of the first signal and the second signal in the first frame and the second frame of the first cycle are positive, and the polarities of the first signal and the second signal in the third frame and the fourth frame of the second cycle are negative.

In step S306, in each of the cycles, a third signal and a fourth signal are respectively inputted into the first glass and the second glass for adjusting the gamma voltages of the first signal and the second signal in the first glass and the second glass so as to make the luminance sensed by the left and right eye the same. The third signal and the fourth signal are inputted in accordance with a gamma curve to adjust the gamma voltages of the first signal and the second signal in the first glass and the second glass. In addition, the first signal and the second signal are outputted from a source driving IC and are image data signals. The third signal and the fourth signal are outputted from a P-gamma IC and are P-gamma signals. According to the aforementioned driving method of the 3D glasses, the gamma voltage of the first glass and the second glass are adjusted to improve the luminance being seen in the left and right eye so as to overcome the 3D image sticking problem and the 3D image overlapping problem at the same time.

Figure 4:
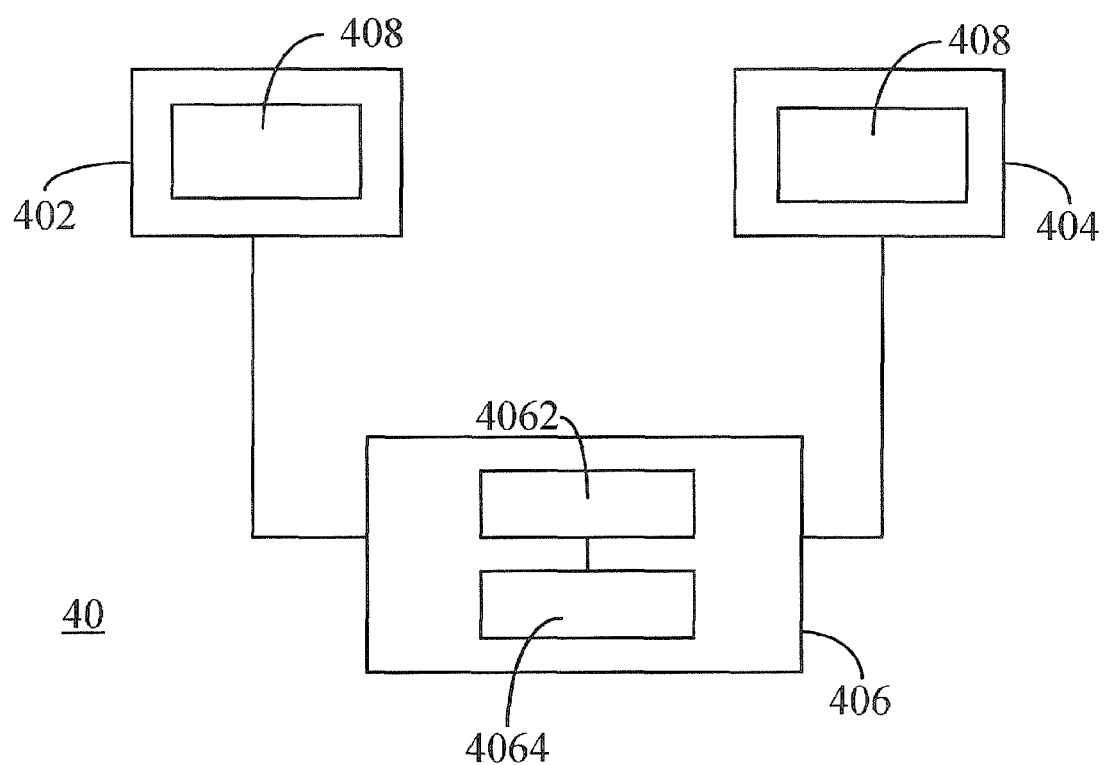
FIG. 4 is a block diagram of the 3D SG in the embodiment of the present invention.

FIG. 4 is a block diagram of the 3D SG in the embodiment of the present invention. As shown in FIG. 4, the 3D SG 40 includes a first glass 402, a second glass 404 and a controlling module 406. In the present embodiment, the first glass 402 is for receiving the left eye image and the second glass 404 is for receiving the right eye image. The first glass 402 and the second glass 404 respectively include a liquid crystal (LC) layer 408. The controlling module 406 is electrically connected with the first glass 402 and the second glass 404 respectively to control the image grayscale of the LC layer 408 in the first glass 402 and the second glass 404 so as to realize transparent or opaque displaying in the first glass 402 and the second glass 404. In the embodiment of the present invention, the controlling module 406 includes a source driving IC 4062 and a P-gamma IC 4064. The source driving IC is for outputting the first signal and the second signal to control the image grayscale in the first glass 402 and the second glass 404. When the current cycle transits into the next cycle, the polarities of the first signal and the second signal are changed. For example, the polarities of the first signal and the second signal in the first frame and the second frame of the first cycle are positive, but the polarities of the first signal and the second signal in the third frame and the fourth frame of the second cycle are negative. The P-gamma IC is for outputting the third signal and the fourth signal to adjust the voltage of the first signal and the second signal for the left and right eye so as to adjust the luminance sensed by the left and right eye. The first signal and the second signal are inputted into the first glass 402 and the second glass 404 by the source driving IC 4062 and the third signal and the fourth signal are inputted into the first glass 402 and the second glass 404 by the P-gamma IC at the same time. The third signal and the fourth signal are respectively for adjusting the gamma voltages of the first signal and the second signal so as to adjust the luminance sensed by the left and right eye.

Figure 5A:
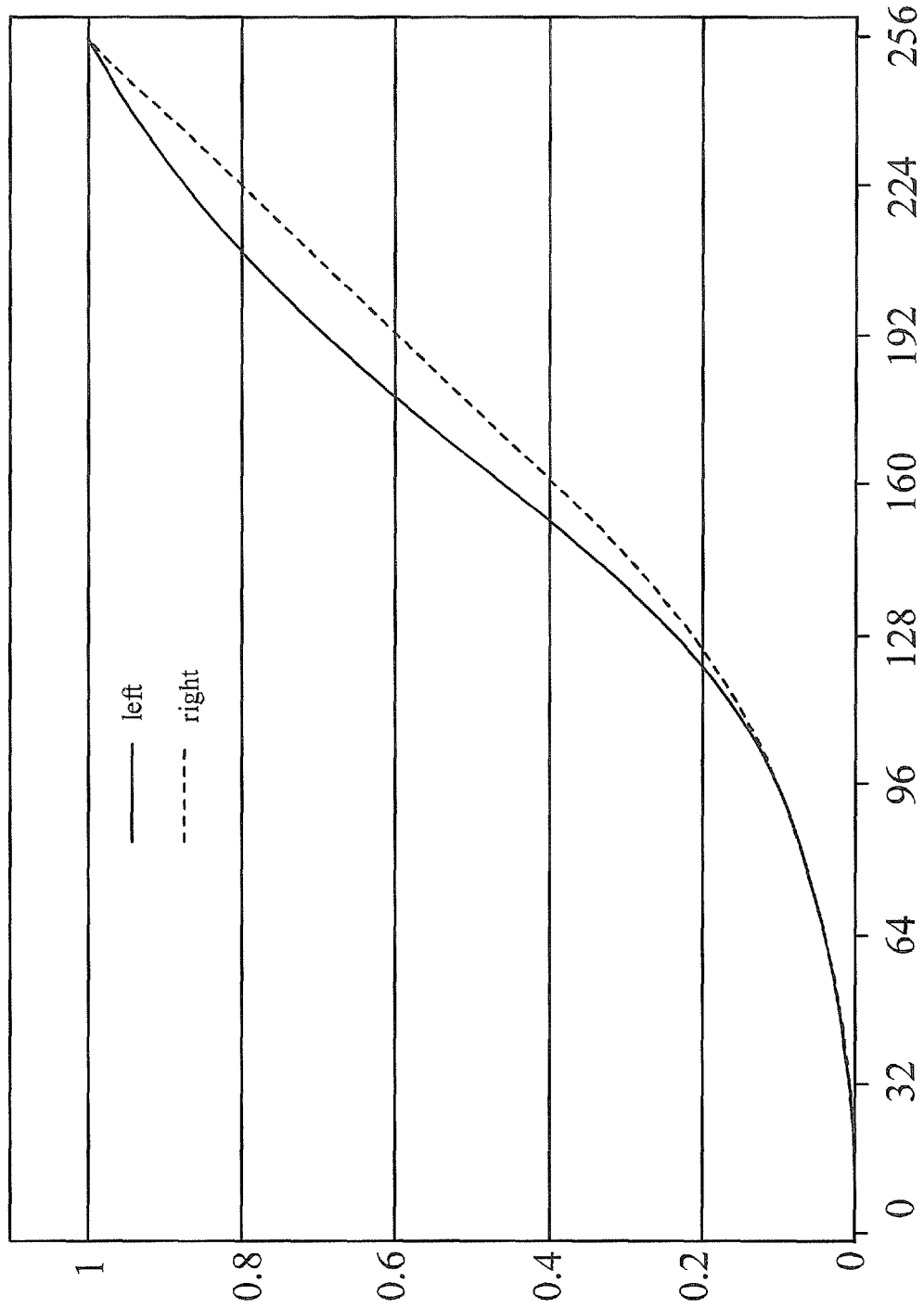
FIG. 5A is a gamma curve view when only one P-gamma signal is implemented in the first glass and the second glass.
Figure 5B:
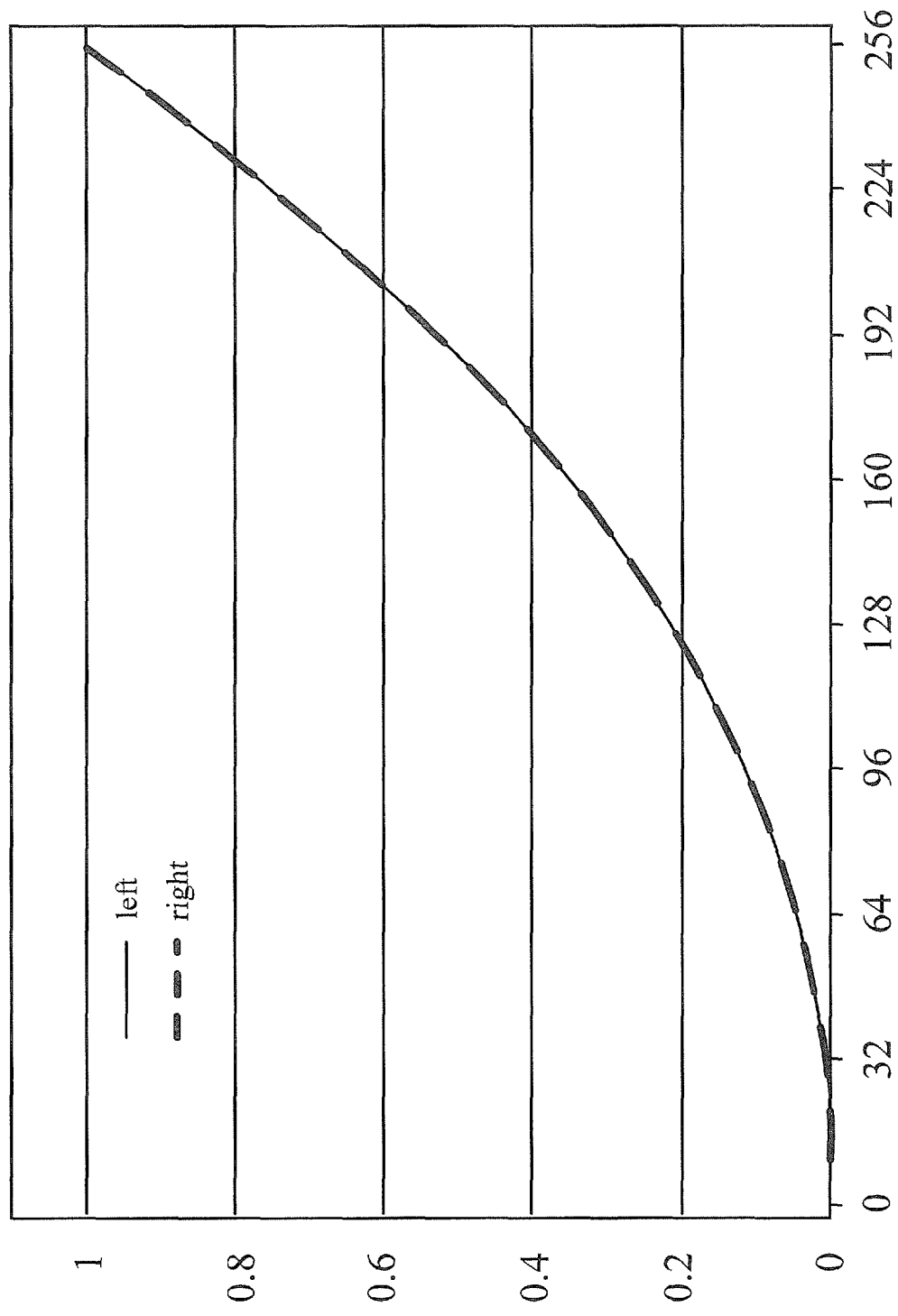
FIG. 5B is a gamma curve view when two P-gamma signals are implemented in the first glass and the second glass.

FIG. 5A is a gamma curve view when only one P-gamma signal is implemented in the first glass and the second glass. As shown in FIG. 5A, since only one P-gamma signal is implemented in the first glass and the second glass, the luminance sensed by the left and right eye is still different. The gamma curves for the first glass and the second glass are not overlapped to be a single curve. Therefore, it is clear to know that the luminance seen in the left and right eye is different. FIG. 5B is a gamma curve view when two P-gamma signals are respectively implemented in the first glass and the second glass. There are two P-gamma signals respectively implemented to adjust the gamma voltages in the glasses for the left and right eye. Since the P-gamma signals inputted in the first glass and the second glass are different, different adjustments can be implemented respectively when the voltages for the left and right eye at brightness or darkness are different so as to make the luminance sensed by the left and right eye the same. As shown in FIG. 5B, the gamma curves in the first glass and the second glass are overlapped to make the luminance sensed by the left and right eye the same.

By using the aforementioned grayscale driving method of the 3D glasses, not only can the 3D image sticking problem due to the charge residue be improved, but the 3D image overlapping problem due to the luminance difference between the left and right eyes becoming larger can also be overcome. Therefore, a better watching result can be achieved when watching 3D images with the 3D shutter glasses.

As described above, the present invention has been described with preferred embodiments thereof and it is understood that many changes and modifications to the described embodiments can be carried out without departing from the scope and the spirit of the disclosure that is intended to be limited only by the appended claims.

What is claimed is:

1. A grayscale driving method for three-dimensional (3D) shutter glasses, comprising:
   for every two frames as a cycle, sequentially inputting a first signal and a second signal into a first glass and a second glass in one cycle, and polarities of the first signal and the second signal in the cycle are the same;
   changing the polarities of the first signal and the second signal when the cycle transits into a next cycle; and
   respectively inputting a third signal and a fourth signal into the first glass and the second glass during the cycle to respectively adjust gamma voltages of the first signal and the second signal in the first glass and the second glass;
   wherein the third signal and the fourth signal respectively adjust the gamma voltages of the first signal and the second signal in accordance with a gamma curve.

2. The grayscale driving method according to claim 1, wherein the first signal and the second signal are image grayscale signals for providing images in the first glass and the second glass, and the third signal and the fourth signal are programmable-gamma (P-gamma) signals for dynamically adjusting the gamma voltages of the first signal and the second signal.

3. A 3D shutter glasses, comprising:
   a first glass for receiving left eye images;
   a second glass for receiving right eye images;
   a liquid crystal (LC) layer being respectively installed in each of the first glass and the second glass; and
   a controlling module electrically connected with the first glass and the second glass, respectively, the controlling module comprising:
      a source driving integrated circuit (IC) for outputting a first signal and a second signal respectively for controlling image grayscales of the LC layers in the first glass and the second glass; and
      a programmable-gamma (P-gamma) IC for outputting a third signal and a fourth signal for respectively adjusting gamma voltages of the first signal and the second signal in the first glass and the second glass;
      wherein the third signal and the fourth signal dynamically adjust the gamma voltages of the first signal and the second signal in accordance with a gamma curve to make luminance sensed by the left and right eye the same.

4. The 3D shutter glasses according to claim 3, wherein the first signal and the second signal are image grayscale signals, and the third signal and the fourth signal are programmable gamma (P-gamma) signals.

5. A grayscale driving method for a three dimension (3D) shutter glasses, comprising:
 for every two frames as a cycle, sequentially inputting a first signal and a second signal into a first glass and a second glass from a source driving IC in one cycle, and polarities of the first signal and the second signal in the cycle are the same;
 changing the polarities of the first signal and the second signal when the cycle transits into a next cycle; and
 respectively inputting a third signal and a fourth signal into the first glass and the second glass from a P-gamma IC during the cycle to respectively adjust gamma voltages of the first signal and the second signal in the first glass and the second glass;
wherein the third signal and the fourth signal respectively adjust the gamma voltages of the first signal and the second signal in accordance with a gamma curve.

6. The grayscale driving method according to claim 5, wherein the first signal and the second signal are image grayscale signals for providing images in the first glass and the second glass, and the third signal and the fourth signal are programmable-gamma (P-gamma) signals for dynamically adjusting the gamma voltages of the first signal and the second signal.

* * * * *